(12) United States Patent
Duval (10) Patent No.: US 9,392,319 B2
(45) Date of Patent: Jul. 12, 2016

(54) SECURE DEVICE PROFILING COUNTERMEASURES

(71) Applicant: Nagrastar LLC, Englewood, CO (US)

(72) Inventor: Gregory Duval, Englewood, CO (US)

(73) Assignee: NAGRASTAR LLC, Englewood, CO (US)

(*) Notice: Subject to any disclaimer, the term of this patent is extended or adjusted under 35 U.S.C. 154(b) by 121 days.

(21) Appl. No.: 13/840,357

(22) Filed: Mar. 15, 2013

(65) Prior Publication Data

US 2014/0283034 A1    Sep. 18, 2014

(51) Int. Cl.
*G06F 21/00* (2013.01)
*G06F 21/55* (2013.01)
*G06F 12/14* (2006.01)
*H04L 12/26* (2006.01)
(Continued)

(52) U.S. Cl.
CPC .......... *H04N 21/4181* (2013.01); *G06F 21/552* (2013.01); *H04L 43/0817* (2013.01); *H04L 63/1416* (2013.01); *H04L 63/1425* (2013.01); *H04L 63/1458* (2013.01); *H04N 7/163* (2013.01); *H04N 21/26606* (2013.01); *H04N 21/4405* (2013.01); *H04N 21/44236* (2013.01); *H04N 21/4623* (2013.01); *H04N 21/63345* (2013.01)

(58) Field of Classification Search
CPC .................... H04N 21/4181; H04N 21/63345; H04N 21/4405; H04N 21/26606; H04N 21/4623; H04N 21/44236; H04N 7/1675; H04N 7/163; G06F 21/552; G06F 21/772; G06F 2221/2101; H04H 60/15; H04H 60/32; H04L 63/1416; H04L 63/1425; H04L 63/1458; H04L 63/1441; H04L 43/0817
USPC ........... 726/22, 32–33; 713/194, 192; 725/25, 725/31
See application file for complete search history.

(56) References Cited

U.S. PATENT DOCUMENTS 5,461,675 A * 10/1995 Diehl et al. ............ 380/229
6,633,644 B2   10/2003 Van Rijnsoever et al.
(Continued)

FOREIGN PATENT DOCUMENTS

EP          1447976          8/2004
EP          1742474          1/2007
(Continued)

OTHER PUBLICATIONS

Francis, Lishoy, et al. "Countermeasures for attacks on satellite tv cards using open receivers." Proceedings of the 2005 Australasian workshop on Grid computing and e-research—vol. 44. Australian Computer Society, Inc., 2005.*

(Continued)

*Primary Examiner* — Michael Simitoski (57) ABSTRACT

Systems and method are disclosed for performing profiling on a secure device. In embodiments, a plurality of counters are established. Each counter may be related to a different type of message. When the secure device receives and/or processes a message, it determines the type of message and adjusts a counter related to the determined message type. A ratio may be computed between the different counters. When the ratio deviates from a threshold, the secure device may be performing illegitimate operations, and one or more countermeasures are deployed against the illegitimate secure device.

20 Claims, 6 Drawing Sheets

(51) Int. Cl.
*H04N 21/418* (2011.01)
*H04L 29/06* (2006.01)
*H04N 7/16* (2011.01)
*H04N 21/442* (2011.01)
*H04N 21/4623* (2011.01)
*H04N 21/266* (2011.01)
*H04N 21/4405* (2011.01)
*H04N 21/6334* (2011.01)
*H04N 5/44* (2011.01)

(56) References Cited

U.S. PATENT DOCUMENTS

| | | | |
|---|---|---|---|
| 6,725,459 B2 | 4/2004 | Bacon | |
| 6,925,183 B2 | 8/2005 | Jiang et al. | |
| 7,245,720 B2 | 7/2007 | Wajs | |
| 7,447,903 B2 | 11/2008 | Sandhu et al. | |
| 7,546,618 B2 | 6/2009 | Bacon | |
| 7,552,457 B2* | 6/2009 | Van De Ven et al. | H04N 7/163 380/210 |
| 7,577,253 B2 | 8/2009 | Schipper et al. | |
| 7,684,567 B2* | 3/2010 | Maillard | H04N 7/163 380/204 |
| 7,908,491 B2* | 3/2011 | Kudelski | H04N 7/1675 380/202 |
| 7,924,835 B2 | 4/2011 | Platnic | |
| 7,986,781 B2* | 7/2011 | Stransky | 380/42 |
| 8,165,293 B2* | 4/2012 | Wajs | 380/239 |
| 8,789,165 B2* | 7/2014 | Bildgen et al. | 726/17 |
| 2001/0046299 A1* | 11/2001 | Wasilewski et al. | 380/282 |
| 2002/0044658 A1 | 4/2002 | Wasilewski et al. | |
| 2002/0126847 A1* | 9/2002 | Wajs et al. | 380/255 |
| 2002/0168963 A1 | 11/2002 | Wajs | |
| 2004/0181811 A1 | 9/2004 | Rakib | |
| 2004/0215691 A1* | 10/2004 | Maria Van De Ven et al. | H04N 7/163 709/200 |
| 2005/0025312 A1* | 2/2005 | Rijkaert et al. | 380/37 |
| 2005/0105886 A1 | 5/2005 | Abelard et al. | |
| 2005/0125195 A1* | 6/2005 | Brendel | 702/182 |
| 2005/0168323 A1 | 8/2005 | Lenoir et al. | |
| 2005/0235307 A1 | 10/2005 | Relan et al. | |
| 2005/0235308 A1* | 10/2005 | Dellow | G06F 21/85 725/25 |
| 2007/0076872 A1* | 4/2007 | Juneau | H04L 63/1408 380/202 |
| 2007/0112580 A1 | 5/2007 | Tang-Talpin et al. | |
| 2007/0174472 A1 | 7/2007 | Kulakowski | |
| 2007/0201695 A1 | 8/2007 | Saarikivi | |
| 2007/0230700 A1 | 10/2007 | Dekker et al. | |
| 2008/0028467 A1* | 1/2008 | Kommareddy et al. | 726/23 |
| 2008/0133749 A1* | 6/2008 | Sample | 709/224 |
| 2008/0192927 A1 | 8/2008 | Stransky | |
| 2008/0279379 A1 | 11/2008 | Muijen | |
| 2008/0298585 A1* | 12/2008 | Maillard et al. | 380/210 |
| 2008/0301437 A1 | 12/2008 | Chevallier et al. | |
| 2009/0077379 A1 | 3/2009 | Geyzel et al. | |
| 2009/0323949 A1* | 12/2009 | Chieze | H04N 7/1675 380/239 |
| 2010/0017605 A1* | 1/2010 | Chieze et al. | 713/168 |
| 2010/0034389 A1* | 2/2010 | Sakharov | G06F 21/10 380/277 |
| 2010/0169664 A1 | 7/2010 | Danois et al. | |
| 2010/0268771 A1 | 10/2010 | Kulakowski et al. | |
| 2010/0310068 A1* | 12/2010 | Fischer | H04N 7/1675 380/43 |
| 2012/0096547 A1* | 4/2012 | Barau et al. | 726/22 |
| 2012/0328099 A1 | 12/2012 | Duval et al. | |
| 2013/0031576 A1* | 1/2013 | Koemmerling | H04N 21/26606 725/31 |
| 2013/0121485 A1* | 5/2013 | Boivin | H04N 21/4405 380/2 |

FOREIGN PATENT DOCUMENTS

| | | |
|---|---|---|
| EP | 2262259 | 12/2010 |
| EP | 2357783 | 8/2011 |
| JP | 2004/186714 A | 7/2004 |
| WO | WO 2010/000876 | 1/2010 |

OTHER PUBLICATIONS

European Search Report for EP 13199732.2 mailed Jul. 3, 2014, 8 pages.
Francis et al. (2005) Australasian Information Security Wrokshop: Digital Rights Management 44:1-6 "Countermeasures for attacks on satellite TV cards using open receivers".
U.S. Appl. No. 13/166,508, Amendment and Response filed Dec. 30, 2013, 14 pages.
PCT International Search Report and Written Opinion mailed Apr. 12, 2012, in Application PCT/US2011/042182, 9 pages.
U.S. Appl. No. 13/166,508, Office Action mailed Dec. 18, 2012 (8 pages).
U.S. Appl. No. 13/166,508, Amendment and Response filed Apr. 18, 2013, 11 pages.
U.S. Appl. No. 13/166,508, Final Office Action mailed Aug. 29, 2013, 10 pages.
European Search Report for EP Application No. 11868319.2, mailed Dec. 4, 2014, 6 pages.
U.S. Appl. No. 13/166,508, Non-Final Rejection mailed Mar. 25, 2015, 12 pages.
U.S. Appl. No. 13/166,508, Amendment and Response filed Sep. 15, 2015, 10 pages.

* cited by examiner

SECURE DEVICE PROFILING COUNTERMEASURES

BACKGROUND

Protected content is broadcast over a network, such as the Internet, satellite, terrestrial, or cable network. Often, subscribers must pay for the content in order to access it. In order to limit the content to legitimate subscribers, the content is scrambled using one or more keys that are made available to legitimate subscribers. However, pirate users may commandeer a legitimate system in order to access the one or more keys. Upon accessing the one or more keys, the keys may be shared with other pirate users thereby allowing them unauthorized access to the protected content. It is with respect to this general environment that embodiments of the present disclosure have been contemplated.

SUMMARY

Systems and methods disclosed herein may be used to profile secure devices to determine whether a secure device is operating in a legitimate or illegitimate manner. In embodiments, the ratio of control messages to management messages received and/or processed by the secure device may be computed and compared to a threshold value that is based upon a ratio of messages processed by a known legitimate secure device or devices. Deviation from the threshold may be used to profile and identify secure devices operating illegitimately. Upon identifying the illegitimate secure devices, countermeasures may be employed to restrict operation of the illegitimate secure devices.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The same number represents the same element or same type of element in all drawings.

DETAILED DESCRIPTION

The various embodiments described herein generally provide systems and methods for providing a countermeasure to the piracy of protected content by employing a conditional key change in a protected system. In embodiments, the systems and methods disclosed herein may be practiced within a Digital Video Broadcasting (DVB) compliant system. DVB is a set of internationally accepted open standards for broadcasting digital television. The DVB standards define both the physical layer and the data link layer of a distributed system. There are DVB standards defining the distribution of content over various different mediums. For example, satellite transmissions are defined in the DVB-S, DVB-S2, and DVB-SH specifications. Cable transmission is defined in the DVB-C and DVB-C2 specifications. Terrestrial television transmission is defined in the DVB-T and DVB-T2 specifications for standard television formats and DVB-H and DVB-H2 for the transmission of mobile television, e.g., television for handheld devices such as mobile phones. Microwave transmission is defined in the DVB-MT, DVB-MC, and DVB-MS standards.

In addition to defining the physical and data link layers, the DVB specifications include three standards that are used to provide conditional access protection of the transmitted content. These standards include the DVB-CA, DVB-CSA, and DVB-CI standards. Conditional access generally refers to protecting content by requiring a device to meet certain criteria before it accesses content. Conditional access plays an important role in ensuring that broadcasted content is made available only to subscribers of a particular broadcast system (e.g., cable and satellite customers, etc). The general DVB architecture uses a global key, called a control word (CW), to perform conditional access. The CW is used to scramble data before it is broadcast to subscribers. The CW is transmitted by a head-end (e.g., a satellite or cable provider) to subscriber devices in an entitlement control message (ECM). The ECM is generally encrypted before transmission to the subscriber device. The conditional access system of the subscriber devices (e.g., a smart card or other conditional access module whether in hardware or software) decrypts the ECM using information received in an entitlement management message (EMM) transmitted from the head-end. The subscriber device can then use the CW to descramble the content broadcasted by the head-end. Generally, a CW is used for a certain period of time, or a crypto period. Upon expiration of a crypto period a new crypto period begins. The head-end may then transmit a new CW to subscriber devices and proceeds to use the new CW to scramble the broadcasted content.

One of the main weaknesses of the DVB conditional access architecture is that a CW can be decrypted and easily shared over the Internet. Generally, a CW may consist of eight bytes. The duration of a crypto period may vary between five to sixty seconds. Thus, all it takes for a non-subscriber to defeat the DVB conditional access architecture is the discovery of the eight-byte CW, a task which may be accomplished within the duration of a typical crypto period. While embodiments of this disclosure are described with respect to a typical DVB system, one of skill in the art will appreciate that the embodiments disclosed herein may be practiced with content protection systems other than a DVB system.

In the context of control word sharing, a legitimate and/or subscribed smart card may be used within an Internet Key Sharing Server (IKSS) pirate device that may extract control words and distribute them over the Internet. A pirate user may connect to the IKSS to access the extracted control words, thus providing the pirate with the ability to illegally descramble protected content, such as pay-tv services.

With respect to a television system employing the DVB architecture, an IKSS may use its subscribed smart card to descramble as many channels as possible, thereby providing pirate users with access to as many channels as possible. In doing so, the IKSS may descramble a greater number of ECM messages than other types of messages, such as, for example, EMM messages because the ECM messages contain the control words or keys used to decrypt content. Additionally, EMM messages may contain management information or countermeasure information, which the IKSS, or other types of pirate devices, try to avoid. However, the IKSS or other type of pirate device cannot operate without decoding at least a portion of EMM messages that contain keys used to decrypt the ECM message. Thus, the ratio of ECM to EMM messages received and/or processed by a pirate user differs from the ratio of legitimate users, who generally process all EMM messages received. By identifying skewed ECM to EMM processing ratios, a security provider or a content provider may identify pirate users.

In various embodiments, different types of EMM messages or management may be transmitted between a head-end and a device. For example, a Global EMM or Global Management Message may be transmitted from the head-end to a device. In embodiments, global messages are sent to all devices participating in the network (e.g., all subscriber devices operating in a DVB network). A Shared EMM message or a Shared Management Message may also be transmitted from a head-end to a device. Shared messages may be sent to a subset of devices operating in a network (e.g., subscribers of a particular channel or service). In embodiments, the subset of devices that received a shared message may be a predefined subset of devices. A Group EMM or Group Management Message may be transmitted from the head-end to a device. Group messages may be transmitted to a subset of devices operating in a network that is dynamically determined at the time the message is sent. A Unique EMM or Unique Management Message may be sent from a head-end to a device. A unique message may be sent to a specific device. While exemplary types of control messages (e.g., ECM messages) and management messages (e.g., EMM messages) are described herein, one of skill in the art will appreciate that more or fewer types of control and/or management messages may be utilized with the embodiments disclosed herein without departing from the spirit or the scope of the disclosure. For example, a control message may be any type of message that contains a key that may be used for decryption. A management message may be any type of message that contains instructions for performing decryption, additional keys used to decrypt control messages, countermeasure information, or any other type of information.

While embodiments have thus far been described with respect to a DVB architecture, one of skill in the art will appreciate that the embodiments disclosed herein may be practiced in other types of architectures, whether used to distribute content or other types of secure data. For example, the embodiments disclosed herein may be practiced in any type of environment in which a first type of message is used to provide a key for decrypting or otherwise accessing data (e.g., an ECM or a control message) and a second type of message used to provide management information (e.g., an EMM or a management message).

Protected content and/or data may transmitted over a network may be accessed and shared through the illegitimate use of a secure device capable of accessing the protected content. It is desirable to identify secure devices that are used for such illegitimate purposes. Systems and methods disclosed herein may be used to profile secure devices to determine whether a secure device is operating in a legitimate or illegitimate manner. In embodiments, the ratio of control messages to management messages received and/or processed by the secure device may be computed and compared to a threshold value that is based upon a ratio of messages processed by known legitimate secure devices. Deviation from the threshold may be used to profile and identify secure devices operating illegitimately. Upon identifying the illegitimate secure devices, countermeasures may be employed to restrict operation of the illegitimate secure devices.

Figure 1:
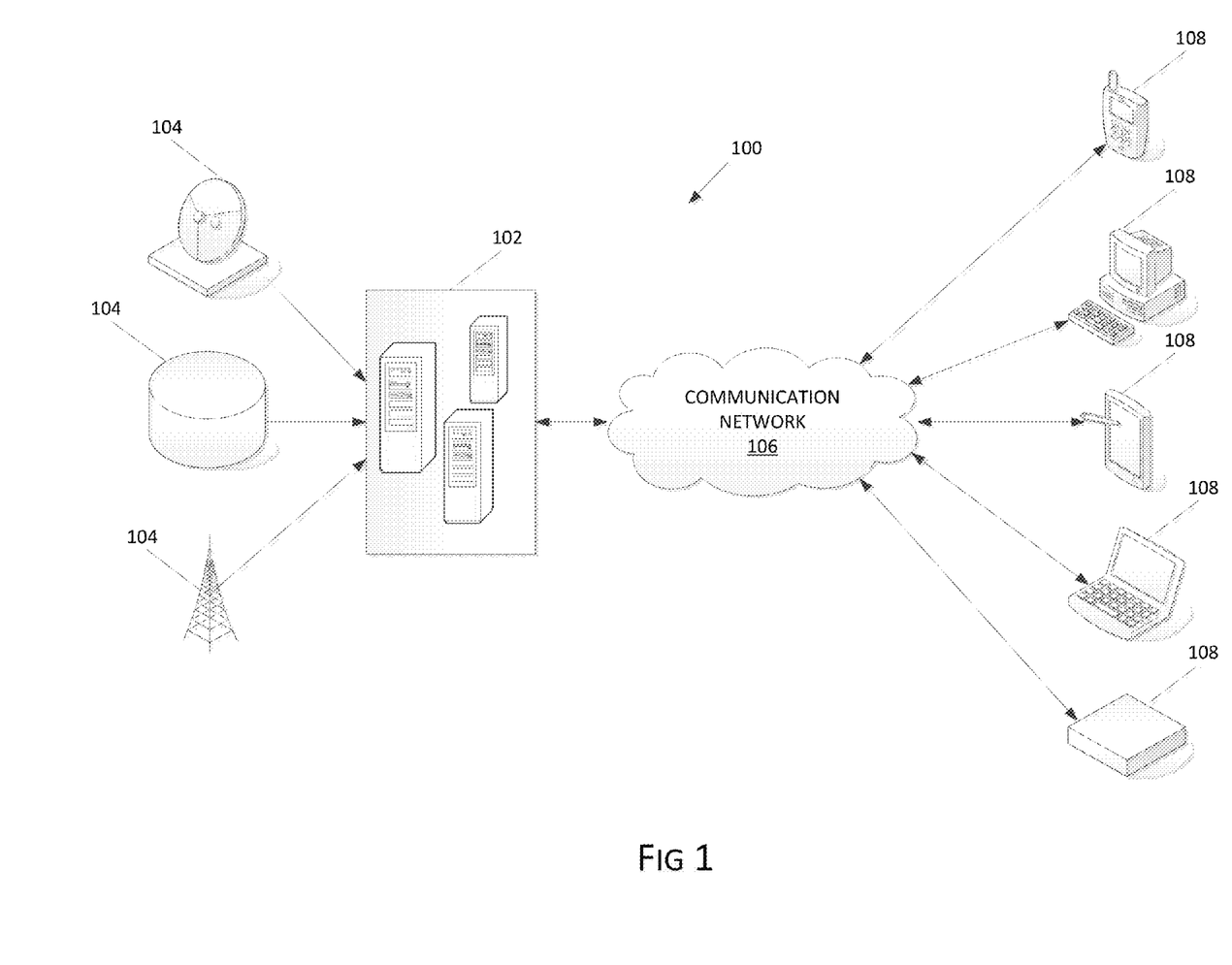
FIG. 1 illustrates a communications system 100 that may be employed with embodiments disclosed herein.

FIG. 1 illustrates a communications system 100 that may be employed with embodiments disclosed herein. The communications system includes a head-end device 102 that receives content from content providers 104 and distributes the content across a communication network 106 to various recipient devices 108. The recipient devices can access the content and display it to a user. A single recipient device 108 can be any device capable of receiving and decoding a data transmission stream over communication network 106. Such devices include, but are not limited to, mobile phones, smart phones, personal digital assistants (PDAs), satellite or cable set-top-boxes, desktop computers, laptop computers, tablet computers, televisions, radios, a video processing device, or any other device known to the art.

In embodiments, recipient devices 108 of subscribers are generally able to access the encryption key used to decrypt the content, while non-subscribers are not able to access the encryption key without circumventing the security measures employed by the head-end device 102 broadcasting the content over the communication network 106. The head-end device 102 may provide recipient devices 108 the encryption key by providing different types of messages to the recipient devices. The first type of message may be used to provide management and control information to the recipient devices 108. The first type of message may also include a key that may be used to access the encryption key used to encrypt the content. An example management message is an EMM message. The second type of message may be a message that contains the encryption key used to protect the content. A recipient device 108 may decrypt the second type of message using a key provided in a management message in order to access the encryption key. An example of a second type of message is an ECM message.

In embodiments, the head-end 102 may be a distribution point of a cable television provider, the distribution of point of a satellite television provider (e.g., a satellite), a terrestrial wireless network, a server broadcasting content over the Internet, or any type of device capable of distributing content over a communications network. One of skill in the art will appreciate that the head-end device 102 may be any type of device, or a collection of devices (as the case may be), that are capable of receiving, encrypting, and broadcasting content over a network.

In one embodiment, the content broadcast over communications system 100 may be generated by the head-end device 102. In other embodiments, the head-end device 102 may receive content from one or more content providers 104. In such embodiments, the head-end device 102 is in electrical communication with one or more content providers 104. For example, a content provider may be a cable, terrestrial, or satellite television station that transmits content to the head-end device 102 over a wired (e.g., cable, fiber optic, or Internet connection) or wireless connection (e.g., via radio, microwave, or satellite communications). In other embodiments, the content may reside in a datastore that is in electrical communication with the head-end device 102. While FIG. 1 depicts the content providers 104 as being separate entities from the head-end device 102, in other embodiments, the content providers 104 and head-end device 102 may be a single entity.

The head-end device 102 is tasked with distributing the content over a communication network 106 to various recipient devices 108. In embodiments, the communication network 106 may be the Internet, a cable network, a fiber optic network, a satellite communications network, a terrestrial broadcasting network (e.g., networks communicating over radio or microwave transmission mediums), a cellular data network, a wide area network (WAN), a local area network (LAN), a plain old telephone service (POTS) network, the Internet, or any other type of communication network capable of streaming, broadcasting, and/or otherwise facilitating data transmissions between various devices. One of skill in the art will appreciate that the systems and methods disclosed herein can be practiced regardless of the type of communication network used to transmit data between devices. In many cases, the head-end device 102 may broadcast the content in a data transmission stream over the communications network rather than sending content to a particular device. Because the content is being broadcast over the communication network 106, the transmission can be received by any number of devices capable of interacting with the communication network 106. In order to prevent unauthorized users from accessing the broadcasted data transmission stream, the head-end device 102 encrypts the data transmission stream before it is broadcast over the communication network 106. In embodiments where the network broadcasted content is made available to multiple devices, a common encryption key (e.g., a control word) may be used to encrypt the network broadcasted content. In embodiments, the network broadcast content may be an encrypted stream that may include content (e.g., audio and/or visual content or other type of content) and data. In embodiments, the data contain information about the stream such as, but not limited to, encryption information, timing information, compression information, or any other type of information. Furthermore, as illustrated in FIG. 1, the communication network may also be used to perform two-way communication between the head-end device 102 and the recipient device or devices 108.

Figure 2:
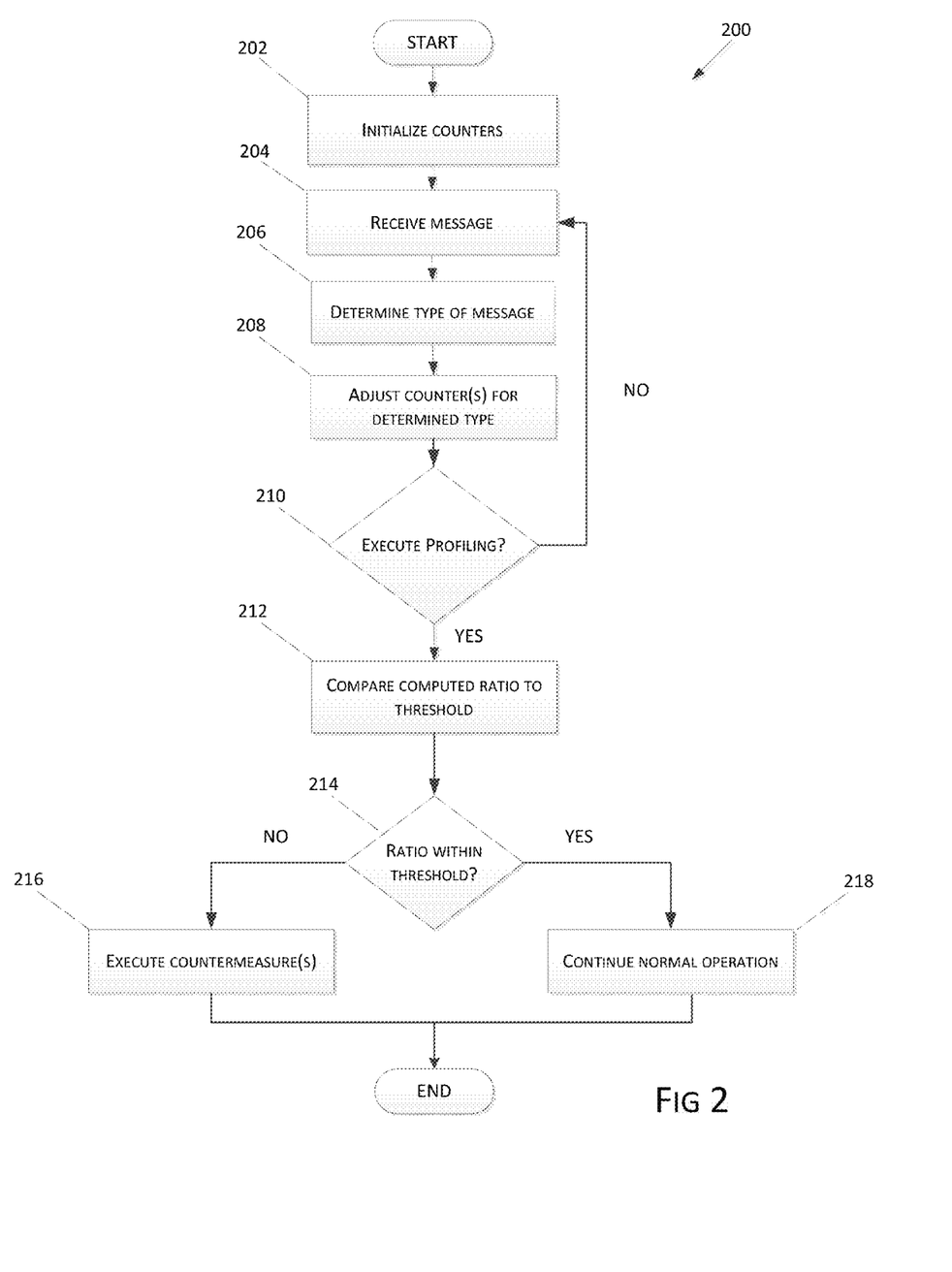
FIG. 2 is a flow chart depicting an exemplary method 200 for performing profiling countermeasures.

FIG. 2 is a flow chart depicting an exemplary method 200 for performing profiling. In embodiments, the method 200 may be performed by a removable secure device, such as, for example, a smart card, a CableCARD, by a secure processor that is part of a computing environment, or by one or more processors in a general computing environment. Flow begins at operation 202 where one or more counters are initialized. Initializing a counter may comprise creating a data in memory to store a clock value. The clock value may be an integer value, a real value, or any other type of value. Initializing the clock may also comprise setting the value to zero, null, or any other value. In embodiments, a counter may be initialized for each type of message received. For example, a first counter may be initialized for control messages and a second counter may be initialized for management messages. In further embodiments, an individual counter may be initialized for each subtype of message, such as for example subtypes of management messages. An example type of control message may be an ECM or any other type of message containing information that can be used to access information. Examples of management messages and subtype messages include, but are not limited to, EMMs, global EMMs, shared EMMs, group EMMs, unique EMMs, etc Flow continues to operation 204 where the device performing the method 200 receives one or more messages. In one embodiment, the messages may be individually received. In another embodiment, the messages may be received in a stream of data that includes other type of information. For example, the message may be received as part of broadcast data, streamed data, or any other type of data that includes content or other information in addition to the message. Upon receiving the message, flow continues to operation 206 where a determination of the type of the message is made. The device performing the method 200 may determine the type of message in order to identify which counter should be incremented (or decremented) upon receipt of the message. For example, a device performing the method 200 may determine whether the message is a control message, a management message, or another type of message. In further embodiments, the determination made at operation 206 may further determine whether the received message is a subtype of a message, such as, for example, a Global EMM, a Shared EMM, a Group EMM, or unique EMM. In further embodiments, the message may be classified as belonging to multiple different types or subtypes of messages. The multiple classifications may also be determined at operation 206.

Upon determining the type of message at operation 206, flow continues to operation 208 where one or more counters are adjusted. In embodiments, the one or more adjusted counters are related type of message determined at operation 208. For example, if the message is determined to be a management message at operation 206, a counter related to management messages is adjusted at operation 208. In embodiments where the message may belong to multiple types of messages, e.g., it is a subtype, multiple counters may be adjusted. For example, if the message is determined to be a subtype of a control message, a counter for a control message and a counter for the subtype of message identified at operation 206 may both be adjusted. In embodiments, adjusting the counter may comprise incrementing a counter each time a type of message related to the counter is received. In an alternate embodiment, adjusting the counter may comprise decrementing a counter each time a type of message related to the counter is received. In such embodiments, initializing the counter at operation 202 may comprise setting the counter to a non-zero value. In still further embodiments, different counters may be adjusted differently. For example, a specific weight or formula may be used to adjust a counter value based on the type of counter or type of message associated with the counter. While specific operations have herein been described with respect to adjusting counters, one of skill in the art will appreciate that any type of counter adjustment known to the art may be employed with the embodiments disclosed herein.

Flow continues to operation 210 where the device determines whether or not to initiate profiling. Profiling may be used to determine whether a secure device is legitimately being used, e.g., a use in conformance with the use of a typical legitimate subscriber, or whether the secure device is being used for illegitimate purposes, e.g., usage by an IKSS or other pirate device. In one embodiment, profiling of the secure device may be performed periodically. For example, profiling may occur hourly, weekly, daily, monthly, etc. In embodiments, the time period for performing the periodic profiling may be set by a management message. In such embodiments, the secure device may automatically perform the profiling upon reaching the time period defined in the management message. In other embodiments, the time period may be determined by the secure device itself or defined at the time of creation of the secure device. In another embodiment, profiling may be performed in response to a trigger or a request. For example, the smart card may receive a request to perform the profiling. The request may be received from a device in communication with the smart card, such as a video processing device or a set-top-box, or by another device communicating with the secure device over a network, such as a head-end device. The request may be transmitted as a part of a message, such as a control message, a management message, or another type of message. For example, when the method 200 is performed in a DVB environment, the request for profiling may be contained in an EMM. In yet another embodiment, profiling may be initiated by an action. Additionally, profiling may be initiated by a secure device before providing a key to decrypt content, such as, for example, before providing a key carried in a control message. In a DVB environment, for example, profiling may execute in response to receiving an ECM or in response to decrypting the ECM to produce a control word.

If a determination is made not to perform the profiling, flow branches NO, returns to operation 204, and continues flow from there. However, if a determination is made to perform the profiling, flow branches YES to operation 212. At operation 212, a ratio may be computed to compare the number of different types of messages received and/or processed by the secure device. For example, a ratio may be computed to compare the number of control messages received and/or processed to the number of management messages received and/or processed. Examples of rations include integer values, real values, and/or other representative values including, but not limited to, factors, variables, etc. The number of messages received may be determined by the stored values in the one or more counters initialized at operation 202. In another embodiment, instead of computing the ratio, the value of the ratio may be computed by another device and received at operation 212. In embodiments, the ratio may be used to profile whether the secure device is used for legitimate or illegitimate purposes. For example, legitimate secure devices generally process a similar number of control messages and management messages but not necessarily the exact same number. On the other hand, illegitimate secure devices may process more control messages than management messages. This is because, in embodiments, the control messages contain keys that are used to access content. For example, in a DVB environment, ECM's contain control words used to access audio/visual data. On the other hand, management messages contain information and/or instructions that may be used to identify illegitimate secure devices, countermeasures to prevent against illegitimate uses, or other information that may prohibit the illegitimate use of a secure device. As such, care is made to only process necessary management messages (e.g., management messages required for the secure device to operate, management messages that contain information used to access control messages, etc.) by those who are illegitimately operating secure devices. Because of this, the number of management messages received and/or processed by an illegitimately used secure device differs greatly from the number of management messages received and/or processed by a legitimate secure device. As such, an illegitimate secure device may receive and/or process less management messages than a legitimate secure device.

In embodiments, the difference may be identified by computing the ratio of control messages received and/or processed to management messages received and or processed (or vice versa) and compared against a threshold value or threshold range to determine whether the secure device is operating within the bounds of legitimate secure devices. Because the number of messages processed by legitimate secure devices may change from device to device (e.g., as described above), the computed ratio is compared to a threshold rather than exact number in order to avoid false positive profiling of illegitimately used secure devices. A threshold may be an integer value, a real value, a fraction, or any other type of value. In embodiments, the threshold may be received in a message, such as a management message, may be computed by the secure device, may be hardcoded into the secure device at the time of the secure device's creation, or may be otherwise provided or retrieved by the secure device.

Flow continues to operation 214 where a determination is made as to whether the ratio meets the threshold or is within a predefined tolerance of the threshold. If the computed ratio is within range of the threshold, flow branches YES to operation 218. At operation 218, the secure device continues normal operation. However, if the ratio is not within the threshold, flow branches NO to operation 216, the secure device is identified as operating illegitimately, and one or more countermeasures are employed against the secure device. In one embodiment, a counter measure may be a refusal by the secure device to decode a control message or otherwise provide a key used to access content or other type of data. In another embodiment, a countermeasure may be a key change. In such embodiments, the secure device performing the method 200 may enact a local key change that may prohibit the device from properly decoding command messages or otherwise providing keys to an illegitimate device, such as an IKSS. In another embodiment, the countermeasure may send a signal to a remote device in control of the content or information distribution, such as a head-end device, which instructs the remote device to perform a global key change for all devices, thereby prohibiting illegitimate access to content by any users who may have received a key from the illegitimate secure device. In an alternate embodiment, the countermeasure employed at operation 216 may kill the secure device, thereby prohibiting the continued illegitimate use of the secure device. In yet another embodiment, the countermeasure may suspend operation of the secure device. Suspending operation of the secure device may prohibit the operation of the secure device while an investigation is performed to determine whether the secure device is actually engaged in illegitimate activity. In embodiments, it may be preferable to suspend the secure device rather than permanently disabling the secure device in order to avoid instances in which the secure device of a legitimate user falsely profiled as an illegitimate device is permanently disabled. In yet another embodiment, the countermeasure may tag the secure device for monitoring, thereby allowing a content provider to gather information about the illegitimate secure device. The information may be used to develop new countermeasure or to build a case for law enforcement. While exemplary countermeasures are described herein, one of skill in the art will appreciate that other types of countermeasures may be employed at operation 216 without departing form the spirit of this disclosure.

The method 200 may be performed multiple times simultaneously. In embodiments, a secure device may be capable of processing multiple streams of data comprising multiple types of messages simultaneously. For example, in a DVB environment, a secure device may be capable of processing multiple streams of content (e.g., multiple broadcast channels) simultaneously. In such embodiments, the method 200 may be performed simultaneously for each stream of data processed by the secure device. In such embodiments, different counters may be adjusted for each of the streams, and different ratios may be computed based using the counters for each stream. As such, in embodiments, each stream processed by the secure device may be individually profiled to determine whether the device is performing legitimately or illegitimately. In yet another embodiment, the method 200 may be performed by aggregating messages from each of the streams processed. In such embodiments, the method 200 may be used to perform and aggregate profiling of the secure device, rather than profiling each stream individually. In such embodiments, an aggregate profile value may be compared to a threshold value to determine whether to perform countermeasures. A threshold for an aggregate profile value may be the same or different (e.g., have a similar or different value) for non-aggregate operations.

In still further embodiments, the method 200 may take into account subtypes of messages and adjust individual counters whenever a message having a subtype is received. For example, if a subtype management message is received, a counter related to the specific subtype may be adjusted. In such embodiments, both a counter related to the management message and a counter related to the subtype of the management message may be adjusted when a determination is made that a received message is a subtype message. In further embodiments, multiple ratios may be computed at operation 212. For example, a first ratio of control message to management messages may be computed, a second ratio of control messages to the subtype of management messages may be computed, and a third ratio of management messages to the subtype of management messages may be computed. In embodiments, each of these ratios may be compared to one or more threshold values, which may be the same or may be different based whether the message is a subtype or not. As such, one of skill in the art will appreciate that the method 200 may be scaled to track and compute ratios for any number of different types of messages received by a secure device or devices. In doing so, profiling may be enhanced by accounting for a plurality of different message types.

Figure 3:
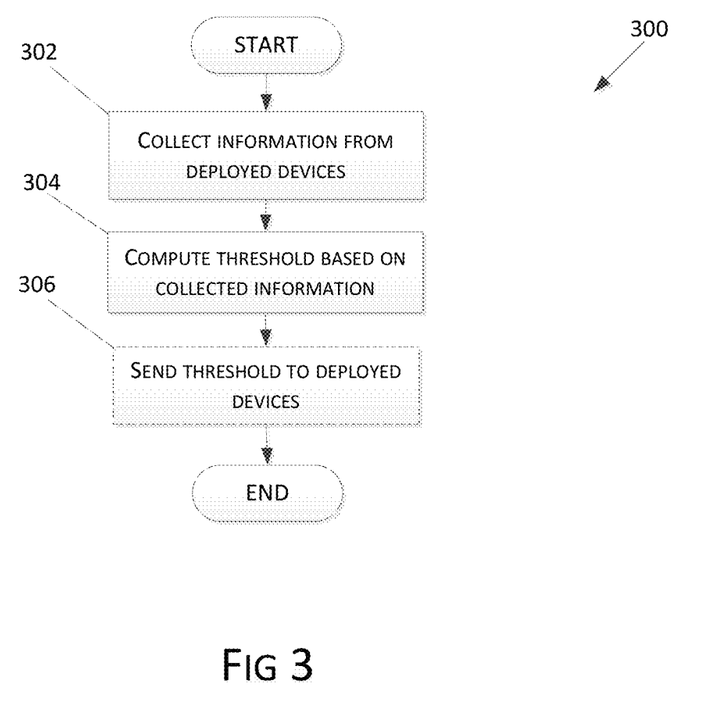
FIG. 3 is an embodiment of a method 300 to determine a threshold.

FIG. 3 is an embodiment of a method 300 to determine a threshold. In embodiments, the method 300 may be performed by a head-end device, a device associated with a secure device manufacturer, the secure device itself, or another device capable of collecting data from remote devices and communicating with a secure device. Flow begins at operation 302 where data is collected from a plurality of secure devices operating in a field. In one embodiment, the data may be collected from secure devices known to be operating legitimately. In another embodiment, the data may be collected from some or all secure devices operating in the field, whether their operation is legitimate or not. Upon collecting the information, flow continues to operation 304 where a threshold value or threshold range is computed based on the information collected from the deployed secure devices. For example, an average ratio or control messages to management messages (or vice versa) may be computed from the data collected at operation 302. This average may then be used as a threshold or provided to another function to compute a threshold. One of skill in the art will appreciate that any type of function known to the art may be employed with the data collected at operation 302 to compute a threshold, or threshold range, at operation 304. Once the threshold is computed, flow continues to optional operation 306. If the device performing the method 300 is not a secure device itself, the computed threshold may be sent to the secure device at operation 306. In embodiments, the message may be sent to the secure device in a management message or in any other type of message. The threshold may be sent in a single message, split and sent in multiple messages, sent as an encrypted message, or sent in any other manner without departing from the spirit of this disclosure. For example, in a DVB environment, a head-end device may send the computed threshold to the device in an EMM. Once the threshold is provided to the secure device it may be used in conjunction with the method 200 described with respect to FIG. 2. In embodiments, the method 300 may be employed one time, or may be periodically employed to provide updated threshold values over time. Although the threshold has thus far been described as having a value, in other embodiments the threshold may be a function or a formula rather than an actual value.

Figure 4:
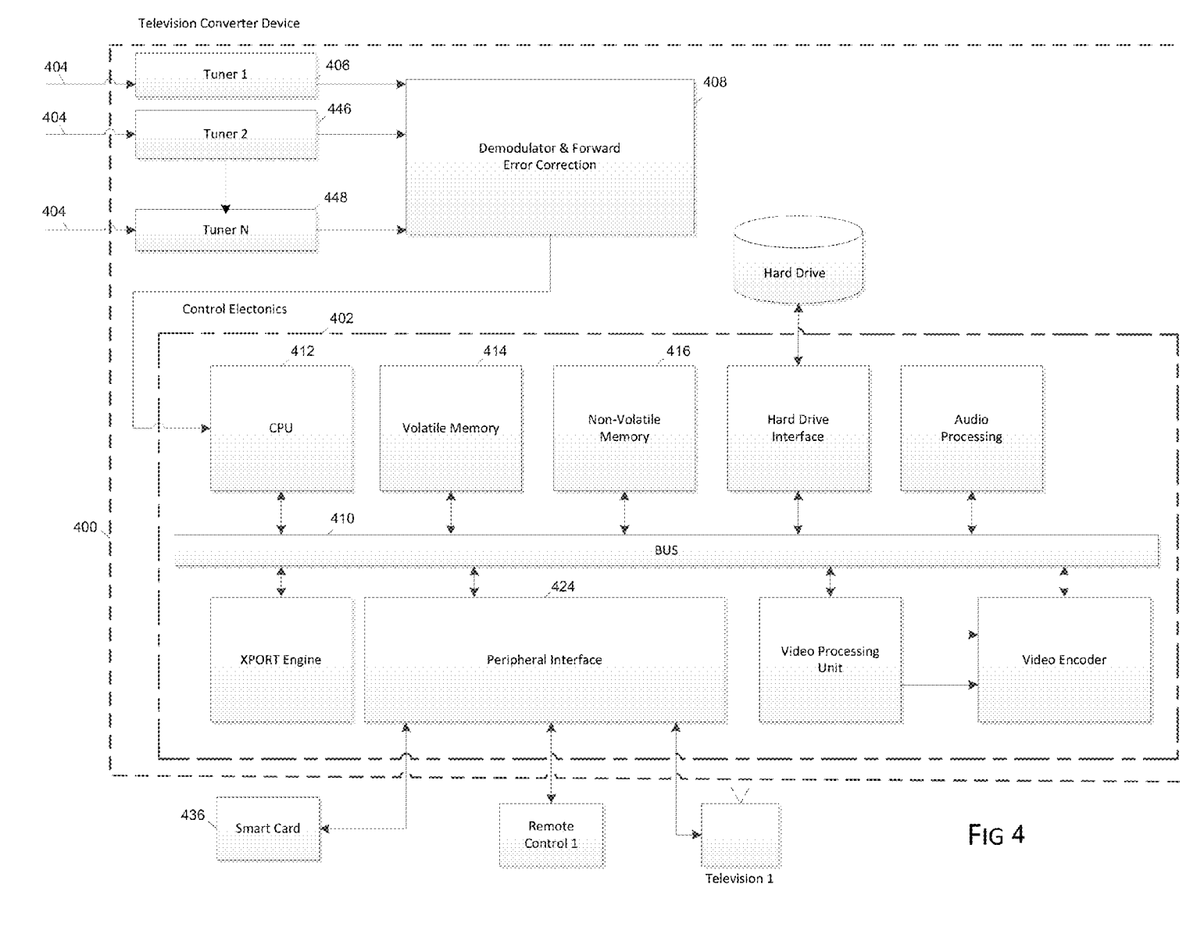
FIG. 4 is an embodiment of a set-top-box 400 that may be utilized to employ the methods disclosed herein.

FIG. 4 is an embodiment of a set-top-box 400 that may be utilized as part of the systems or methods disclosed herein. While FIG. 4 is illustrated with various components, many of the components are known to the art and do not need explanation. Only the components that may be used to perform the methods disclosed herein are described. The signal 404 that arrives at the set-top-box 400 may undergo extensive processing. The television converter 400 may include one or more tuner devices 406, 446, 448 that may receive a satellite signal 404. In this embodiment, tuner devices 406, 446, 448 acquire a signal 404 from a head-end or content provider. Tuner devices 406, 446, 448 may initially process the signal 404. Tuner device 406, 446, 448 may also receive subscriber commands in the form of signals from control electronics unit 402. Signals from control electronics unit 402 may include, but is not limited to, a signal to tune to a transponder as part of the process of selecting a certain channel for viewing on a peripheral device. One skilled in the art would recognize that the tuner devices 406, 446, 448 may include fewer, more, or different components. The signal 404 may include content encoded by a CW. The signal 404 may also include one or more ECMs and EMMs.

After receiving the signal 404, one of the first steps may be to demodulate 408 the signal 404. The signal 404 may arrive as an analog signal that "carries" data (e.g., data is modulated onto the analog signal). Demodulation 408 may be accomplished by reversing the modulation process. Modulation can be done in several ways. Modulation may include amplitude modulation (AM) or frequency modulation (FM). If the carried data is digital, modulation methods include, but are not limited to, biphase-shift keying (BPSK), quadraphase-shift keying (QPSK), or eight-phase shift keying (8PSK). One skilled in the art will recognize that other methods of modulating and demodulating the signal 404 may be possible. Another one of the first steps may also be to error check 408 signal 404. One example of error checking 408 is forward error checking (FEC). FEC 408 may include, but is not limited to, inspecting parity bit or bits that may accompany signal 404. One skilled in the art will recognize that many methods for error checking are possible. For the purposes of discussion, an embodiment using digital data will be discussed below. However, one skilled in the art will recognize that systems with analog data or combined analog and digital data are also possible and contemplated herein.

In embodiments, set-top-box 400 contains control electronics unit 402 that receives signal 404. One skilled in the art will recognize that control electronics 402 may receive other signals, including, but not limited to, signals from a cable, satellite, or broadcast television distributor. In this embodiment, control electronics unit 402 includes discrete electronic components combined into a single circuit with a shared bus 410. In other embodiments, control electronics unit 402 may be configured differently. For example, one or more of the control electronics unit 402 components in set-top-box 400 may be combined or omitted. As a further example, one or more of the control electronics unit 402 components in set-top-box 400 may not share a bus 410, but may nonetheless be operatively connected by some other means. One skilled in the art will recognize that other configurations of set-top-box 400 and control electronics unit 402 are possible and within the scope of this invention. One skilled in the art will further recognize that some components of set-top-box 400 and control electronics unit 402 may be implemented in hardware or software. The control electronics unit 402 may operate under the control of a software program, firmware program, or some other program stored in memory or control logic. One skilled in the art will also recognize that the control electronics unit 402 may include other electronic components or structures to mediate or process signals.

Control electronics unit 402 may contain one or more central-processing-units (CPUs) 412 or processors. In this embodiment, control electronics unit 402 contains a single CPU 412 that is operatively connected to the shared bus. In this embodiment, CPU 212 may be used, among other things, for logical operations for set-top-box 400 functions including, but not limited to, channel selection, recording control, EPG display and control and system maintenance. One skilled in the art will recognize that the CPU 412 may be integrated with memory or other discrete electronics components. In embodiments, CPU 412 may be used to perform the systems and methods disclosed herein.

Control electronics unit 402 may contain one or more volatile memory components 414. Volatile memory components 414 may include, but are not limited to, one or more SDRAM memory chips. Similarly, control electronics unit 402 may also contain one or more non-volatile memory components 416. Non-volatile memory 416 may include one or more memory chips, including, but not limited to, ROM, SRAM, SDRAM and Flash ROM. One skilled in the art will recognize that volatile memory 414 and non-volatile memory 416 may be integrated within other electronics components. One skilled in the art will also recognize that other memory components may be included within set-top-box 400 and control electronics unit 402. One skilled in the art will recognize that memory 414, 416 may be used for many purposes, including, but not limited to, storing EPG data and storing data for use by CPU 412. In embodiments, the Volatile memory components 414 and/or one or more non-volatile memory components 416 may be used to store the counter or executable instructions to perform the methods 200-300 disclosed herein.

A set-top-box 400 may be connected to one or more peripheral electronic devices through peripheral interface 424. These peripheral devices may include a smart card 436 or other type of removable or non-removable secure device. In embodiments, the smart card 436 acts as a conditional access system. In such embodiments, the smart card 436 performs the methods 200-300 disclosed herein.

Figure 5:
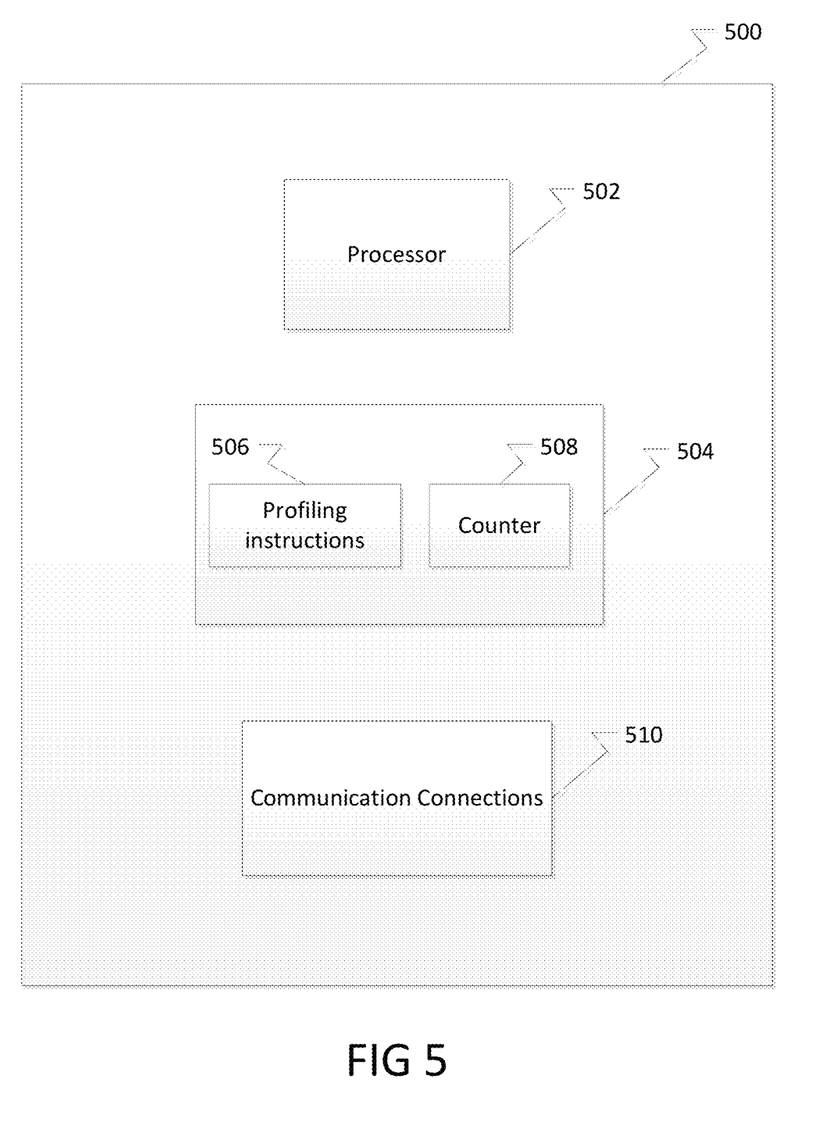
FIG. 5 is an illustration of an embodiment of a secure device 500 that may be employed to perform the systems and methods disclosed herein.

FIG. 5 is an illustration of an embodiment of a secure device 500 that may be employed to perform the systems and methods disclosed herein. In embodiments, secure device 500 may be a smart card, a CableCARD, a SoC, or any other type of removable or non-removable secure device. In embodiments, secure device 500 includes one or more processing units 502. In some embodiments, one or more components of the methods described herein are performed by the one or more processing units 502. For example, the processing unit 502 may establish, increment, and/or decrement one or more counters, or perform the various profiling operations described herein. The one or more processing units 502 may also perform the determination of message types (e.g., control messages and/or management messages) disclosed herein. The one or more processing units 502 may also generate and or provide the false keys described herein.

Secure device 500 may also include memory 504. Memory 504 includes, but is not limited to, RAM, ROM, EEPROM, flash memory or other memory technology, CD-ROM, digital versatile disks (DVD) or other optical storage, magnetic cassettes, magnetic tape, magnetic disk storage, other magnetic storage devices, or any other medium which is used to store the desired information and which is accessed by smart card 500 and one or more processing units 502. Memory 504 may store executable instructions to perform the methods disclosed herein. For example, memory 504 may include profiling instructions 506 to perform the profiling embodiments and/or threshold determining embodiments disclosed herein. Memory may also store the one or more counters and/or counter values 508.

Secure device 500 may also contain communications connection(s) 510 that allow the device to communicate with other devices. Communication connection(s) 510 is an example of communication media. Communication media may embody a modulated data signal, such as a carrier wave or other transport mechanism and includes any information delivery media, which may embody computer readable instructions, data structures, program modules, or other data in a modulated data signal. The term "modulated data signal" means a signal that has one or more of its characteristics set or changed in such a manner as to encode information or a message in the data signal. By way of example, and not limitation, communication media includes wired media such as a wired network or direct-wired connection, and wireless media such as an acoustic, RF, infrared, and other wireless media. In embodiments, control messages and/or management messages and or requests to perform profiling may be received via communications connection(s) 510. In still further embodiments, the instructions to perform the profiling embodiments described herein may be received via communications connection(s) 510. For example, a head-end or other device may update the secure device 500 with instructions to perform the methods disclosed herein. Such instructions may be stored in memory 504. Communications connection(s) 510 thereby allows a head-end or other device to update secure devices deployed in the field to be with instructions to perform the methods disclosed herein.

Figure 6:
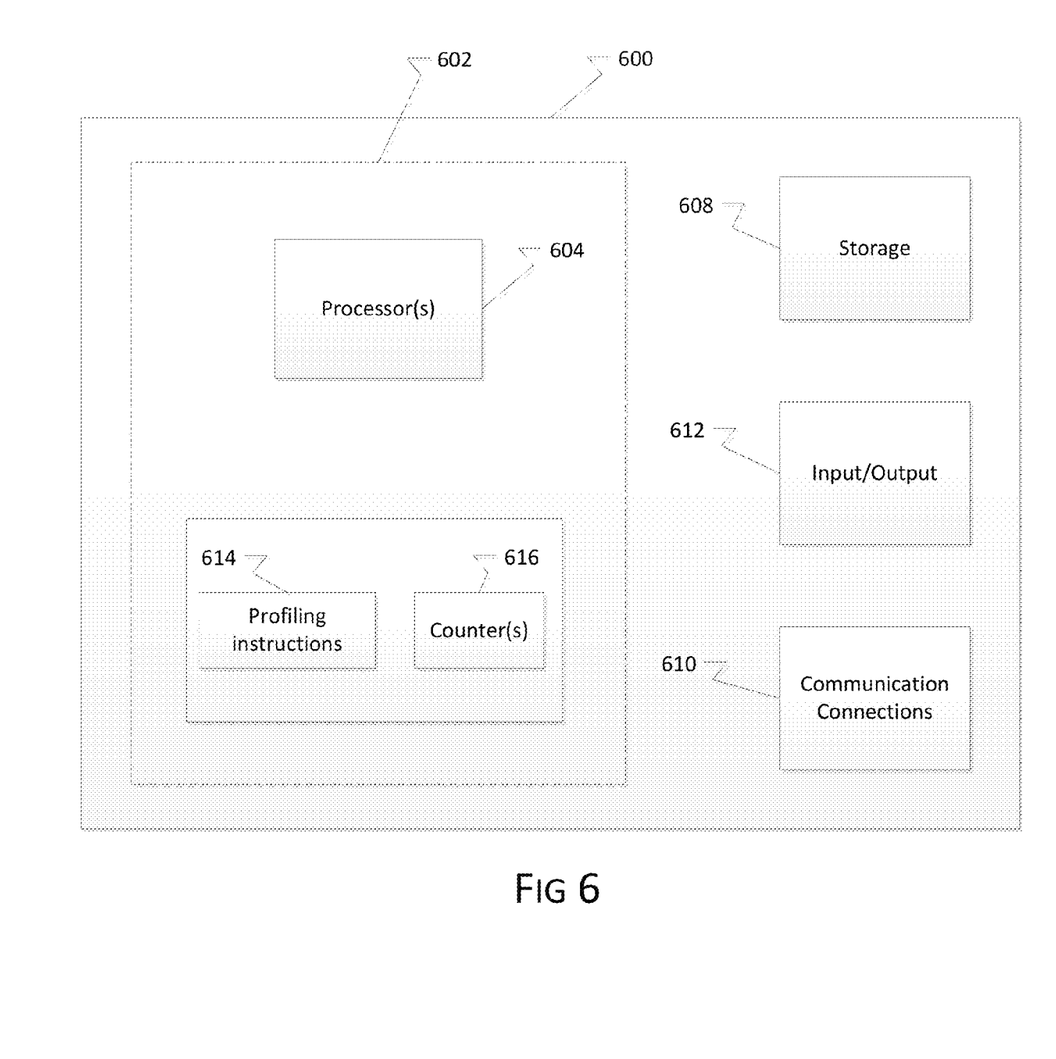
FIG. 6 an embodiment of a computing environment 600 that may be used to implement the various embodiments described herein.

With reference to FIG. 6, an embodiment of a computing environment 600 for implementing the various embodiments described herein. Any and all components of the described embodiments (such as the set-top box, head-end device, a laptop, mobile device, personal computer, a video processing device, etc.) may execute as or on a client computer system, a server computer system, a combination of client and server computer systems, a handheld device, and other possible computing environments or systems described herein. As such, a basic computer system applicable to all these environments is described hereinafter.

In its most basic configuration, computer system 600 comprises at least one processing unit or processor 604 and system memory 606. The most basic configuration of the computer system 600 is illustrated in FIG. 6 by dashed line 602. In some embodiments, one or more components of the described system are loaded into system memory 606 and executed by the processing unit 604 from system memory 606. Depending on the exact configuration and type of computer system 600, system memory 606 may be volatile (such as RAM), non-volatile (such as ROM, flash memory, etc.), or some combination of the two.

Additionally, computer system 600 may also have additional features/functionality. For example, computer system 600 may include additional storage media 608, such as removable and/or non-removable storage, including, but not limited to, solid state storage, magnetic or optical disks or tape. In some embodiments, software or executable code and any data used for the described system and methods is permanently stored in storage media 608. Storage media 608 includes volatile and non-volatile, removable and non-removable media implemented in any method or technology for storage of information such as computer readable instructions, data structures, program modules, or other data.

System memory 606 and storage media 608 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage, other magnetic storage devices, or any other medium which is used to store the desired information and which is accessed by computer system 600 and processor 604. Any such computer storage media may be part of computer system 600. In some embodiments, system memory 606 and/or storage media 608 may store data used to perform the methods or form the system(s) disclosed herein. In other embodiments, system memory 606 may store profiling instructions 614 to perform the embodiments described herein and one or more counters and/or counter values 616.

Computer system 600 may also contain communications connection(s) 610 that allow the device to communicate with other devices. Communication connection(s) 610 is an example of communication media. Communication media may embody a modulated data signal, such as a carrier wave or other transport mechanism and includes any information delivery media, which may embody computer readable instructions, data structures, program modules, or other data in a modulated data signal. The term "modulated data signal" means a signal that has one or more of its characteristics set or changed in such a manner as to encode information or a message in the data signal. By way of example, and not limitation, communication media includes wired media such as a wired network or direct-wired connection, and wireless media such as an acoustic, RF, infrared, and other wireless media. In an embodiment, management and/or control messages be transmitted or received over communications connection(s) 610.

In some embodiments, computer system 600 also includes input and output connections 612, and interfaces and peripheral devices, such as a graphical user interface. Input device(s) are also referred to as user interface selection devices and include, but are not limited to, a keyboard, a mouse, a pen, a voice input device, a touch input device, etc. Output device(s) are also referred to as displays and include, but are not limited to, cathode ray tube displays, plasma screen displays, liquid crystal screen displays, speakers, printers, etc. These devices, either individually or in combination, connected to input and output connections 612 are used to display the information as described herein. All these devices are well known in the art and need not be discussed at length here.

In some embodiments, the component described herein comprise such modules or instructions executable by computer system 600 that may be stored on computer storage medium and other tangible mediums and transmitted in communication media. Computer storage media includes volatile and non-volatile, removable and non-removable media implemented in any method or technology for storage of information such as computer readable instructions, data structures, program modules, or other data. Combinations of any of the above should also be included within the scope of readable media. In some embodiments, computer system 600 is part of a network that stores data in remote storage media for use by the computer system 600.

This disclosure described some embodiments of the present invention with reference to the accompanying drawings, in which only some of the possible embodiments were shown. Other aspects may, however, be embodied in many different forms and should not be construed as limited to the embodiments set forth herein. Rather, these embodiments were provided so that this disclosure was thorough and complete and fully conveyed the scope of the possible embodiments to those skilled in the art.

Although specific embodiments were described herein, the scope of the invention is not limited to those specific embodiments. One skilled in the art will recognize other embodiments or improvements that are within the scope and spirit of the present invention. Therefore, the specific structure, acts, or media are disclosed only as illustrative embodiments. The scope of the invention is defined by the following claims and any equivalents therein.

What is claimed is:

1. A method for performing device profiling on a secure device, the method comprising:
    instantiating at least two counters on the secure device;
    receiving, at the secure device, a first plurality of messages in a first data stream;
    processing, by the secure device, a first message of the first plurality of messages;
    determining that the first processed message has a first type;
    based upon the determination that the first message has the first type, adjusting a first counter related to the first type;
    processing, by the secure device, a second message of the first plurality of messages;
    determining that the second processed message has a second type, the second type different from the first type;
    based upon the determination that the second message has the second type, adjusting a second counter related to the second type;
    processing, by the secure device, a third message of the first plurality of messages;
    determining that a third message is a subtype of the second message;
    based upon the determination, adjusting a third counter related to the subtype;
    determining whether to perform profiling of the secure device; and
    when it is determined that profiling should be performed, performing operations comprising:
        computing a first ratio of the first counter to the second counter;
        comparing the first ratio to a first threshold;
        computing a second ratio of the first counter to the third counter;
        comparing the second ratio to a second threshold; and
        when the first ratio does not meet the first threshold, executing at least one countermeasure; and
    when the second ratio does not meet the second threshold, executing the at least one countermeasure.

2. The method of claim 1, wherein the first message type is a control message.

3. The method of claim 2, wherein the second message type is a management message.

4. The method of claim 3, wherein the control message is an entitlement control message (ECM).

5. The method of claim 4, wherein the management message is an entitlement management message (EMM).

6. The method of claim 1, wherein the third message comprises one of:
    a global EMM;
    a shared EMM;
    a group EMM; and
    a unique EMM.

7. The method of claim 1, further comprising:
receiving a second plurality of messages in a second data stream;
processing, by the secure device, a fourth message of the second plurality of messages;
determining that the fourth message has a fourth type;
based upon the determination, adjusting a fourth counter related to the third type;
processing, by the secure device, a fifth message of the second plurality of messages;
determining that the fifth message has a fourth type, the fifth type different from the fourth type;
based upon the determination, adjusting a fifth counter related to the fifth type;
computing a second ratio of the fourth counter to the fifth counter;
comparing the third ratio to a third threshold; and
when the third ratio does not meet the third threshold, executing the at least one countermeasure.

8. The method of claim 7, wherein the first data stream corresponds to a first channel and the second data stream corresponds to a second channel, the second channel different from the first channel.

9. The method of claim 1, wherein the at least one counter measure comprises one of:
a key change;
killing the secure device;
suspending the secure device; and
tagging the secure device.

10. A non-transitory computer storage medium encoding computer executable instructions that, when executed by at least one processor, perform a method for performing device profiling on a secure device, the method comprising:
instantiating at least two counters on the secure device;
receiving, at the secure device, a first plurality of messages in a first data stream;
processing, by the secure device, a first message of the first plurality of messages;
determining that the first message has a first type;
based upon the determination, adjusting a first counter related to the first type;
processing, by the secure device, a second message of the first plurality of messages;
determining that the second message has a second type, the second type different from the first type;
based upon the determination, adjusting a second counter related to the second type;
processing, by the secure device, a third message of the first plurality of messages;
determining that a third message is a subtype of the second message;
based upon the determination, adjusting a third counter related to the subtype;
determining whether to perform profiling of the secure device; and
when it is determined that profiling should be performed, performing operations comprising:
computing a first ratio of the first counter to the second counter;
comparing the first ratio to a first threshold;
computing a second ratio of the first counter to the third counter;
comparing the second ratio to a second threshold; and
when the first ratio does not meet the first threshold, executing at least one countermeasure; and
when the second ratio does not meet the second threshold, executing the at least one countermeasure.

11. The non-transitory computer storage medium of claim 10, wherein the third message comprises one of:
a global EMM;
a shared EMM;
a group EMM; and
a unique EMM.

12. The non-transitory computer storage medium of claim 10, wherein the method further comprises:
receiving a second plurality of messages in a second data stream;
processing, by the secure device, a fourth message of the second plurality of messages;
determining that the fourth message has a fourth type;
based upon the determination, adjusting a fourth counter related to the fourth type;
processing, by the secure device, a fifth message of the second plurality of messages;
determining that the fourth message of the plurality of messages has a fifth type, the fourth type different from the fourth type;
based upon the determination, adjusting a fifth counter related to the fifth type;
computing a third ratio of the fourth counter to the fifth counter;
comparing the third ratio to a third threshold; and
when the third ratio does not meet the third threshold, executing at least one countermeasure.

13. The non-transitory computer storage medium of claim 12, wherein the second threshold is different from the first threshold.

14. The non-transitory computer storage medium of claim 10, wherein the first type is an entitlement control message (ECM).

15. The non-transitory computer storage medium of claim 14, wherein the second type is an entitlement management message (EMM).

16. A removable secure device comprising at least one processor and memory encoding computer executable instructions that, when executed by the at least one processor, perform a method for performing device profiling on a secure device, the method comprising:
instantiating at least two counters on the removable secure device;
receiving, at the removable secure device, a first plurality of messages in a first data stream;
processing, by the removable secure device, a first message of the first plurality of messages;
determining that the first message has a first type;
based upon the determination, adjusting a first counter related to the first type;
processing, by the removable secure device, a second message of the first plurality of messages;
determining that the second message has a second type, the second type different from the first type;
based upon the determination, adjusting a second counter related to the second type;
processing, by the removable secure device, a third message of the first plurality of messages;
determining that a third message is a subtype of the second message;
based upon the determination, adjusting a third counter related to the subtype;
determining whether to perform profiling of the removable secure device; and
when it is determined that profiling should be performed, performing operations comprising:

computing a first ratio of the first counter to the second counter;
comparing the first ratio to a first threshold;
computing a second ratio of the first counter to the third counter;
comparing the second ratio to a second threshold; and
when the first ratio does not meet the first threshold, executing at least one countermeasure and;
when the second ratio does not meet the second threshold, executing a countermeasure.

17. The removable secure device of claim 16, wherein the first message is an entitlement control message (ECM) and the second message is an entitlement management message (EMM).

18. The removable secure device of claim 16, wherein removable secure device is a smartcard for a set-top-box.

19. The removable secure device of claim 16, wherein the third message comprises on of:
   a global EMM;
   a shared EMM;
   a group EMM; and
   a unique EMM.

20. The removable secure device of claim 16, wherein the at least one counter measure comprises one of:
   a key change;
   killing the secure device;
   suspending the secure device; and
   tagging the secure device.

* * * * *